UNITED STATES PATENT OFFICE.

FLORENTINE J. MACHALSKE, OF PLATTSBURG, NEW YORK, ASSIGNOR TO AMERICAN FERROLECTRIDE CORPORATION, OF PLATTSBURG, NEW YORK, A CORPORATION OF NEW YORK.

PROCESS OF SMELTING IRON ORE.

1,148,700.     Specification of Letters Patent.     Patented Aug. 3, 1915.

No Drawing.     Application filed May 6, 1914. Serial No. 836,638.

*To all whom it may concern:*

Be it known that I, FLORENTINE J. MACHALSKE, a citizen of the United States, residing at Plattsburg, Clinton county, New York, have invented certain new and useful Improvements in the Process of Smelting Iron Ore, of which the following is a full, clear, and exact description.

My invention relates to a new and improved process of reducing iron ore and has for its object to provide a process for producing a high grade iron almost free from carbon, phosphorus, titanium, silicon and manganese, which shall be very ductile and contains substantially no occluded gases. The product also takes a high polish and resists oxidation.

My improved process is an improvement upon that set out in my application Serial No. 776,156 (Patent No. 1,099,709, dated June 9, 1914) and in carrying it out, I preferably use the electrode and furnace described in my applications, Serial Nos. 776,157 and 776,158, all filed on the 27th day of June, 1913 (Patents Nos. 1,099,558 and 1,099,559, dated June 9, 1914). It is particularly useful in treating titaniferous iron ore such as found in the Adirondack region of the State of New York. In carrying out my process with this ore and the furnace and electrode above referred to, I introduce into the furnace a basic charge of ore, flux and artificial graphite, the flux being preferably calcium oxid in the form of burnt lime or unburnt lime. In making the charge I use substantially the theoretically required amount of carbon in the form of artificial graphite and enough calcium oxid to maintain the charge basic throughout all stages of the smelting process. The necessary calcium oxid can be introduced at the start or may be added from time to time, care being taken that an excess amount of the basic flux sufficient to maintain the charge basic, is present at all stages. I have found that where the basic flux is all to be introduced at the start, a satisfactory charge is obtained by using the following proportions: 100 parts of ore, 14 parts of artificial graphite and 50 parts of unburnt lime. I have found that with these proportions the charge remains basic during the whole smelting operation. In treating this charge in the furnace referred to, the charge is subjected to an electric current and the ore is reduced by being heated in the presence of the artificial graphite and the oxygen combines therewith to form carbon monoxid in the ordinary manner. The titanium, manganese and silicon present combine with the excess basic flux so as to be eliminated and are removed in the form of slag. The molten metal is drawn off and cast into bars or ingots, or any other desired form and produces an improved product, which on cooling is crystalline in form, free from slag, and very ductile. It contains no occluded oxygen or nitrogen or other gas, resists oxidation and takes a high polish. It is substantially pure slag-free ferrite, by which I mean, iron or steel containing no carbid (or only a trace) in solid solution.

By my improved reducing process, the manganese present in the ore is entirely eliminated in the finished product and only slight traces of titanium remain. The carbon in the product may be reduced to below 0.025%, the phosphorus to below 0.015% and the silicon to below 0.02%, even when the phosphorus, titanium and manganese are unusually high in the ore.

The product described but not claimed herein is described and claimed in a division hereof, filed on the 4th day of June, 1914, Serial No. 842,864.

What I claim is:

1. The improvement in the process of electrically reducing iron ore which comprises forming a basic charge composed of iron ore, graphite and a basic flux, subjecting this charge to an electric current and maintaining the charge basic during the entire reducing process, the graphite being substantially equal to the amount of carbon theoretically required.

2. The improvement in the process of electrically reducing iron ore which comprises forming a basic charge composed of iron ore containing titanium, and artificial graphite and a basic flux, subjecting this charge to an electric current and maintaining the charge basic during the entire reducing process, the graphite being substantially equal to the amount of carbon theoretically required.

3. The process of electrically reducing iron ore which comprises forming a basic charge composed of iron ore containing phosphorus, and artificial graphite and a basic flux, subjecting the same to an electric current and maintaining the charge basic during the entire reducing operation, the graphite being substantially equal to the amount of carbon theoretically required.

4. The improvement in the process of electrically reducing iron ore, which comprises forming a basic charge composed of iron ore containing manganese, and graphite and a lime flux, subjecting this charge to an electric current, and maintaining the same basic during the entire reducing process, the graphite being substantially equal to the amount of carbon theoretically required.

5. The improvement in the process of electrically reducing iron ore which comprises forming a basic charge composed of 100 parts iron ore, 14 parts artificial graphite, and a basic flux, subjecting this charge to an electric current and maintaining the charge basic during the entire reducing process.

FLORENTINE J. MACHALSKE.

Witnesses:
A. A. BEAN,
MARGARET FITZPATRICK.